United States Patent [19]

Siranni et al.

[11] 3,983,371
[45] Sept. 28, 1976

[54] APPARATUS AND METHOD FOR DETERMINING THE PROPORTION OF DEFECTIVE WIRE IN A LENGTH OF MOVING WIRE

[75] Inventors: J. Donald Siranni, Sugar Run; Charles W. Smith, Bethel Park, both of Pa.

[73] Assignee: GTE Sylvania Incorporated, Stamford, Conn.

[22] Filed: Jan. 6, 1975

[21] Appl. No.: 538,869

[52] U.S. Cl............................. 235/151.3; 324/37; 235/92 MT
[51] Int. Cl.²................. G01B 19/32; G01N 27/82
[58] Field of Search........ 324/37; 235/151.3, 92 DN

[56] References Cited
UNITED STATES PATENTS

| | | | |
|---|---|---|---|
| 3,612,838 | 10/1971 | Conn | 235/151.3 |
| 3,633,211 | 1/1972 | Batzdorff | 235/92 DN |
| 3,729,619 | 4/1973 | Layeak | 235/92 DN |
| 3,745,451 | 7/1973 | Goyette | 324/37 X |
| 3,790,761 | 2/1974 | Crabtree | 235/92 DN |
| 3,825,821 | 7/1974 | Förster | 324/37 X |

Primary Examiner—Eugene G. Botz
Attorney, Agent, or Firm—Norman J. O'Malley; Lawrence R. Fraley; Donald R. Castle

[57] ABSTRACT

An apparatus and method are disclosed for determining the proportion of defective wire in a length of wire moving along an established path. The apparatus comprises a first detection means for providing a first signal indication of the rate of travel of said wire, a first summing means for providing a second signal representative of the length of said wire, a second detection means for providing a third signal indicative of defective portions within said wire, a second summing means for providing a fourth signal representative of the length of said defective portions, and a computation means for providing an output indication representative of the proportion of said length of said defective portions to the length of said wire. The method comprises the steps of detecting the rate of travel of said wire, providing a signal representative of the length of said moving wire, detecting the defective portions of said wire, providing a signal representative of the length of said defective portions, and computing the described signals to provide an output indication representative of the proportion of said defective lengths to the length of said wire.

13 Claims, 1 Drawing Figure

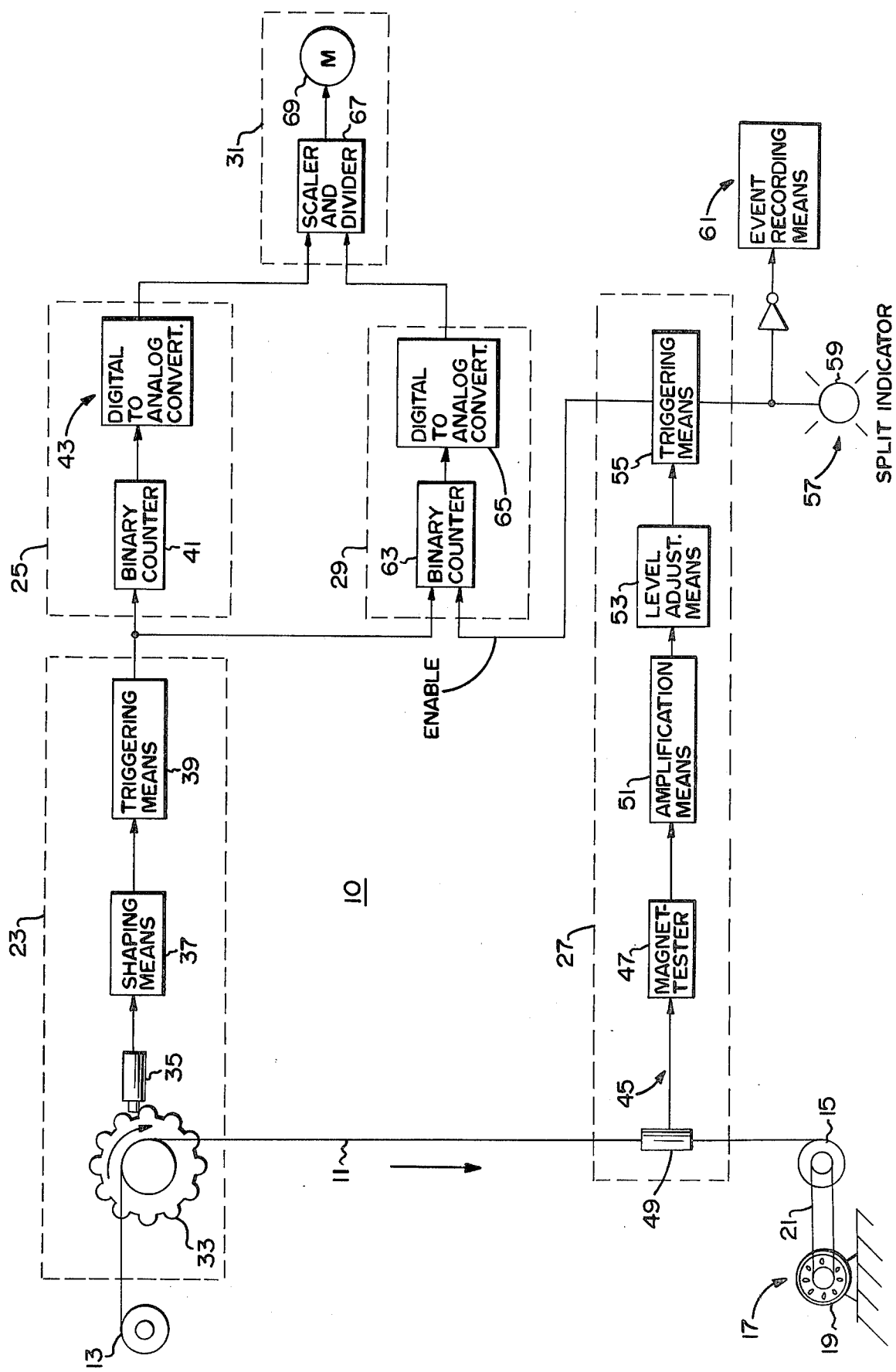

APPARATUS AND METHOD FOR DETERMINING THE PROPORTION OF DEFECTIVE WIRE IN A LENGTH OF MOVING WIRE

BACKGROUND OF THE INVENTION

The present invention relates to apparatus and methods for detecting defects in moving wire.

More particularly, the invention relates to apparatus and methods for determining the proportion of defective wire in a length of moving wire.

Apparatus and methods for detecting defective wire have varied from simple visual inspection to highly complex electronic devices capable of providing a series of corresponding functions. These functions primarily involved corrective measures such as shuting down the winding or drive apparatus to remove the defective portion or simply indicating when said defective portions were present.

As can be appreciated, there are several instances wherein wire as produced by standard manufacturing practices may still contain minor defective portions therein and still be acceptable by manufacturing standards. Heretofore, there has never been known to exist an apparatus or method which is capable of providing an output indication representative of the proportion of defective areas or lengths of the wire relative to the total length as detected. Such an apparatus and method would be highly advantageous in the wire making art in that not only would a provision exist for detecting minor defects in moving wire but also a ready indication of when these defects constitute an unacceptable product.

It is believed therefore that an apparatus and method which can provide an output indication representative of the proportion of the length of defective portions in a length of moving wire would constitute an advance in the art.

OBJECTS AND SUMMARY OF THE INVENTION

It is therefore a primary object of this invention to provide an apparatus for determining the proportion of defective wire in a length of moving wire.

It is a further object of the invention to provide such an apparatus which provides an output indication of a ratio thereof representative of the proportion of the lengths of defective portions of the wire relative to the total length of the wire.

It is another object of the invention to provide a method for determining the proportion of defective wire in a length of moving wire.

BRIEF DESCRIPTION OF THE DRAWING

The drawing illustrates a preferred embodiment of the apparatus of the present invention

DESCRIPTION OF THE PREFERRED EMBODIMENTS

For a better understanding of the present invention together with other and further objects, advantages and capabilities thereof, reference is made to the following disclosure and appended claims in connection with the above described drawing.

Referring with particularity to the drawing, there is illustrated a detection apparatus 10 in accordance with a preferred embodiment of the present invention. Apparatus 10 is capable of determining the portion of defective wire in a length of a moving wire 11 as said wire travels along an established path, indicated by directional arrow 12. Wire 11 is illustrated in the drawing as being supplied from a supply means 13 to a takeup means 15. In both of the examples above, each of the described means comprises a spool member having wire 11 positioned therearound. To drive wire 11 along the described established path, a drive means 17, illustrated as motor 19 is provided. Motor 19 is operatively connected to takeup spool 15 through a pulley or drive belt 21. It is understood that the aforementioned supply spool, takeup spool, and motor drive means are well known components in the prior art and further description of these compounds is not believed necessary.

As illustrated, apparatus 10 comprises a first detection means 23, a first summing means 25, a second detection means 27, a second summing means 29, and a computation means 31.

As illustrated, first detection means 23 is positioned relative to the established path of travel of moving wire 11. Means 23 is capable of providing a first signal which is indicative of the rate of travel of wire 11. In the preferred embodiment of the invention, detection means 23 comprises a rotatable spur gear member 33 operatively engaged to moving wire 11. Thus when wire 11 is moving along the described established path of travel 12, it causes rotation of gear 33 in the direction indicated. As can be seen, first detection means 23 further comprises a magnetic pickup unit 35 which is adapted for magnetically detecting each of the upstanding teeth members on spur gear 33 as gear 33 rotates in the manner described. Detection of each of these teeth members results in a pulse output to a shaping means 37. Shaping means 37 is operatively connected to the magnetic pickup unit 35 and is adapted for substantially shaping said first signal to a predetermined configuration. This signal in turn is applied to a triggering means 39, preferably a schmitt trigger. Schmitt trigger 39 in turn is further adapted for triggering first summing means 25 upon receiving said shaped signal from shaping means 37. It is understood that the described pulse shaping means 37 and schmitt trigger 39 serve as additional components to the described detection means 23 and therefore are not meant to limit the overall broad concept of this particular feature of the present invention. That is, it can be understood that the magnetic detection unit itself is capable of providing a signal to summing means 25. However, the described means 37 and 39 are preferred to facilitate transmission of a more sound electrical signal to the described summing means 25.

First summing means 25 is illustrated as being operatively connected to first detection means 23 for receiving the described first signal therefrom. First summing means 25 is in turn adapted for providing a second signal representative of the length of wire 11 which has moved along the aforementioned established path 12. In the preferred embodiment of the invention, first summing means 25 comprises a binary counter 41 which in turn provides said second signal in digital output form. First summing means 25 further comprises a conversion means 43, illustrated as a digital to analogue-converter, which receives the digital second signal from counter 41 and converts said digital signal to analogue output form. It can be understood that conversion means 43 provides solely an added preferred function to summing means 25 in that counter 41 is solely capable of providing an acceptable second signal. However, as will be explained, it is preferred to provide the described second signal in analogue form. Thus a means has been provided for supplying a second signal representative of the length of wire 11 moving along the established path of travel.

With further reference to the drawing, second detection means 27 is illustrated as being positioned relative to the aforementioned established path of travel of wire 11 and is capable of providing a third signal indicative of defective portions within wire 11. Second detection means 27 preferably comprises a detection unit 45, which in turn comprises a standard Magnatester member 47 operatively connected to a detector head 49. As can be seen, wire 11 passes through detector head 49 wherein the described defective portions are magnetically detected and a resulting signal is provided the aforementioned magnatester 47. It can be understood that detection unit 45 could consist of other components than those illustrated. For example, unit 45 could comprise a standard crack detector having a detector head similar to member 49. In the detection means as described, the described third signal as provided is indicative of the defective portions as passing through head 49. Thus, as defective portions of wire 11 pass through head 49, a resulting signal is supplied magnatester 47. Second detection means 27 is shown as further comprising an amplification means 51, a level adjustment means 53, and a triggering means 55. Each of these components serve auxiliary functions in second detection means 27 and are therefore not meant to limit the overall broad concept of this feature of the invention. The described means are added primarily to process the described third signal to a desired output level. More particularly, the signal as received by amplification means 51 is thus amplified to a specified level and transmitted to level adjustment means 53. When this signal reaches the output level as determined by adjustment means 53, it is transmitted further to triggering means 55 which in the preferred embodiment of the invention comprises a schmitt trigger. Schmitt trigger 55 in turn is operatively connected to second summing means 29 and is adapted for triggering said summing means upon receiving the described control third signal from adjustment means 53.

Operatively connected to schmitt trigger 55 of second detection means 27 is an indication means 57 illustrated simply as a light bulb 59. Indication means 57 is thus capable of providing a visual output indication representative of the detection of the aforementioned defective portions of wire 11. It can be understood that indication means 57 is merely a preferred added component to the present invention and therefor is not meant to restrict the broad concept of the present invention in any manner.

Also operatively connected to second detection means 27 is a recording means 61 which is adapted for recording the described detections of the aforementioned defective portions. Similar to indication means 57, recording means 61 provides only an auxiliary function to the present invention. Recording means 61 is primarily added to assist in the tabulation of data for an operator of apparatus 10 and more particularly to provide him with a running tabulation of the number of defective portions within wire 11 as detected by detection head 49.

Second summing means 29 preferably comprises a binary counter 63. As shown, counter 63 is operatively connected to both first detection means 23 and second detection means 27. As further illustrated, the signal from triggering means 55 of second detection means 27 provides an enabling function to counter 63 when the counter receives the described first signal. Counter 63 additionally receives the described first signal from triggering means 39 of the first detection means 23. Counter 63, substantially similar to counter 41 in first summing means 25, is adapted for providing a fourth signal in digital output form to a conversion means 65 operatively connected thereto which in turn converts said digital signal to analogue output form. Thus it can be seen that a fourth signal in analogue form is provided from second summing means 29 to computation means 31. In addition, a second signal in analogue form has been provided from first summing means 25 to computation means 31.

As shown, computation means 31 is operatively connected to first and second summing means 25 and 29 respectively and is further adapted for providing an output indication of a ratio representative of the proportion of the length of the detected defective portions of the wire 11 relative to the length of wire 11 moving along the mentioned established path. In the preferred embodiment of the invention, computation means 31 comprises a scaling and dividing means 67 which serves to scale and divide the aforementioned received second and fourth signals from first and second summing means, respectively. The results of the scaling and dividing operation are provided on a meter 69 operatively connected to means 67. Thus an indication in the form of a percentage is readily provided by apparatus 10. As described, this percentage represents the proportion of the total length of the detected defective portions to the total length of wire as passed through apparatus 10. The operator of apparatus 10 thus readily ascertains when the provided percentage output exceeds a pre-established level. Should meter 69 indicate an excessive value, the operator may then stop drive means 17 and remove the defective portion from the entire spool. It can be seen therefore that the operator also is provided a continuous indication as to the percentage level of defective portions of wire 11. Accordingly, still another advantageous purpose for apparatus 10 is provided. That is, detected wire exhibiting an established percentage of defective portions therein may be suitable in some applications and not in others. Accordingly, each spool can therefore be correspondingly marked or designated for said purposes. It is therefore not necessary to destroy or replace entire spools of wire which can heretofore be utilized in other acceptable applications. Such a provision has not been afforded in detection apparatus of the prior art.

EXAMPLE OF OPERATION

The following example is meant solely for explanatory purposes and is not meant in any manner to restrict the overall braod concept of the proposed present invention.

Supposing that an established number of pulses were provided through detector 35 as wire 11 moves in accordance with a predetermined rate of travel, this total number of pulses would be provided first summing means 25. For example, assuming that spur gear 33 were calibrated to provide 10 pulses per foot of travel of wire 11, in 100 foot of wire, first summing means 25 would receive a total of 1,000 pulses. Assuming that detector head 49 detected a total of 7 areas or lengths of defective portions in wire 11 as the wire moves therethrough, indicator 57 would visually indicate a total of 7 events. Assuming that 4 of the described events are 1 foot in duration and 3 of the events are 2 foot in duration, or a total of 10 foot, recorder 61 would still record but 7 events. However, for each of the 4 events measuring 1 foot long, second summing means 29 would count 10 pulses for a total of 40 pulses. For each of the described 3 events of 2 foot duration, second summing means 29 would count 20 pulses for a total of 60 pulses. Accordingly, second summing means 29 has counted a total of 100 pulses. This count of 100 is supplied computation means 31. Additionally, computation means 31 has received the described total of 1,000 pulses from first summing means 25. The described scaling and dividing means 67 thus provides a ratio of the total defective portions to the total length of travel or an equivalent proportion of 100 to 1,000 or 10 per cent.

PREFERRED COMPONENTS OF THE INVENTION

In accordance with the preferred invention, the detection unit 35 of first detection means 23 is an Airpax Proximity Pickup, model No. 1-0001, available from the Airpax Co. P.O. Box 8488 Ft. Lauderdale Fla., 33310. Additionally, shaping means 37 is an integral part of schmitt trigger 39 which is, available from the Texas Inst. Co. model no. SN7413, P.O. Box 5012 Dallas, Texas, 75221.

The described detection unit 45 of second detection means 27 is preferably an Institute Dr. Förster Magnatester, model no. 2,156, available from the Krautkramer-Branson Co., 76 Progress Drive, Stamford Ct. 06904. Additionally, amplification means 51 is preferably a differential transistor amplifier consisting of a Fairchild Model UA741 dip operational amplifier, available from Fairchild Semiconductor Components Group, 464 Ellis St., Mountain View, California 94040. Level adjustment means 53 is preferably a transistor amplifier consisting of transistors 2N697 and 2N3905 available from the above mentioned Fairchild, Co. and triggering means 55 is preferably a schmitt trigger available from the Texas Instruments Corporation described above.

For each of the binary counters 41 and 63 of first and second summing means respectively, it is preferred to use a binary counter composed of cascaded Motorola flip-flops type MC790P, available from Motorola Semiconductor Products Inc., Box 20912, Phenox, Arizona 85036. Conversion members 43 and 65 of means 25 and 29 respectively are available under model no. DA225C, from the Computer products Company, P.O. Box 23849, Ft. Lauderdale, Fla. 33307.

The scaling and dividing means 67 of computation means 31 is preferably comprised of at least one Fairchild UA741 dip operational amplifier, available from the above mentioned Fairchild Co., for each input to the divider section. The divider is preferably a Motorola Model MC1595 available from the above mentioned Motorola Co.

Accordingly, meter 69 for providing the desired percentage output is available under model no. 1931-tautband, from the Weston Instruments Co., 614 Frelinghuysen Ave., New Jersey 07114.

It is understood that the above described components are merely preferred items for utilization in the present invention and are therefore not meant to restrict the broad concept of the present invention as defined. It is further understood that several of the above-mentioned components could be satisfactorily replaced by similarly functioning members with the desired results still being attainable.

Thus there has been shown and described an apparatus and a method for determining the proportion of defective wire in a length of moving wire as the wire moves along an established path. Such an apparatus and method provides the advantageous result in the form of a percentage output whereby the operator of the apparatus can readily ascertain the resulting percentages of defective portions within the described moving wire.

While there has been shown and described what are at present considered the preferred embodiments of the present invention, it will be obvious to those skilled in the art that various changes and modifications may be made therein without departing from the scope of the invention as defined by the appended claims.

What is claimed is:

1. An apparatus for determining the proportion of defective wire in a length of wire moving along an established path, said apparatus comprising:

first detection means positioned relative to said established path of travel of said moving wire for providing a first pulse signal having a pulse rate proportioned to the rate at which said wire travels along said path;

first summing means including a binary counter operatively connected to said first detection means for counting the pulses of said first signal and for providing a second signal in digital output form representative of the length of said wire moving along said established path;

second detection means positioned relative to said established path for providing a third signal indicative of defective portions of said moving wire;

second summing means including a binary counter operatively connected to said first and second detection means for receiving said first and third signals respectively, for counting said pulses included in said first signal in response to enablement by said third signal, and for providing a fourth signal in digital output form representative of the length of said defective portions of said wire moving along said established path; and computation means operatively connected to said first and second summing means for receiving said second and fourth signals respectively, and for providing an output indication of a ratio thereof representative of the proportion of said length of said defective portions of said wire to said length of wire moving along said established path.

2. The apparatus according to claim 1 further including an indication means operatively connected to said second detection means for providing an output indication representative of the detection of said defective portions of said wire.

3. The apparatus according to claim 1 further including a recording means operatively connected to said second detection means for recording the detection of said defective portions of said wire.

4. The apparatus according to claim 1 wherein said first detection means further includes a shaping means for substantially shaping said first signal to a predetermined configuration.

5. The apparatus according to claim 4 wherein said first detection means further includes a triggering means operatively connected to said shaping means and said first summing means for triggering said first summing means upon receiving said shaped signal from said shaping means.

6. The apparatus according to claim 1 wherein said second detection means further includes an adjustment means for controlling the level of output of said third signal.

7. The apparatus according to claim 6 wherein said second detection means further includes a triggering means operatively connected to said adjustment means and said second summing means for triggering said second summing means upon receiving said controlled third signal from said adjustment means.

8. The apparatus according to claim 1 wherein said first summing means further includes a conversion means operatively connected to said binary counter for converting said digital signal from said binary counter to analogue output form.

9. The apparatus according to claim 1 wherein said second summing means further includes a conversion means operatively connected to said binary counter for converting said digital signal from said binary counter to analogue output form.

10. The apparatus according to claim 1 wherein said computation means comprises a scaling and dividing means for scaling and dividing said second and fourth signals from said first and second summing means, respectively.

11. A method for determining the proportion of defective wire in a length of wire moving along an established path, said method comprising:
   detecting the rate of travel of said wire as said wire travels along said established path and providing a first pulse signal having a pulse rate proportional to said rate of travel;
   counting said pulses of said first signal and providing a second signal in digital output form representative of the length of said wire moving along said established path;
   detecting the defective portions in said length of moving wire and providing a third signal indicative of said defective portions;
   counting said pulses included in said first signal in response to enablement by said third signal and providing a fourth signal in digital output form representative of the length of said defective portions; and
   computing said second and fourth signals and providing an output indicative of a ratio thereof representative of the proportions of said lengths of said defective portions relative to said length of wire moving along said established path.

12. The method according to claim 11 further including the step of providing an output indication representative of said detection of said defective portions of said wire.

13. The method according to claim 12 further including the step of recording said detection of said defective portions.

* * * * *